(12) United States Patent
Phan

(10) Patent No.: US 11,022,087 B2
(45) Date of Patent: Jun. 1, 2021

(54) DOUBLE-REGULATED TURBINE, INSTALLATION FOR CONVERTING HYDRAULIC ENERGY AND PROCESS FOR THE REHABILITATION OF A DOUBLE-REGULATED TURBINE

(71) Applicant: Alstom Renewable Technologies, Grenoble (FR)

(72) Inventor: Hai Trieu Phan, Grenoble (FR)

(73) Assignee: Alstom Renewable Technologies, Grenoble (FR)

( * ) Notice: Subject to any disclaimer, the term of this patent is extended or adjusted under 35 U.S.C. 154(b) by 538 days.

(21) Appl. No.: 15/308,169

(22) PCT Filed: Apr. 17, 2015

(86) PCT No.: PCT/EP2015/058447
§ 371 (c)(1),
(2) Date: Nov. 1, 2016

(87) PCT Pub. No.: WO2015/169568
PCT Pub. Date: Nov. 12, 2015

(65) Prior Publication Data
US 2017/0058857 A1   Mar. 2, 2017

(30) Foreign Application Priority Data

May 8, 2014  (EP) .................................... 14290142

(51) Int. Cl.
*F03B 3/06* (2006.01)
*F03B 11/04* (2006.01)
(Continued)

(52) U.S. Cl.
CPC ................ *F03B 3/06* (2013.01); *F03B 3/123* (2013.01); *F03B 11/04* (2013.01); *F03B 13/10* (2013.01);
(Continued)

(58) Field of Classification Search
CPC .... F03B 3/06; F03B 13/10; F03B 3/12; F03B 3/121; F03B 3/123; F03B 3/14;
(Continued)

(56) References Cited

U.S. PATENT DOCUMENTS 1,853,136 A * 4/1932 Moody ................... F03B 3/121
                                                            415/191
2,357,628 A * 9/1944 Boerger .................. F03B 3/121
                                                            29/889.72
(Continued)

FOREIGN PATENT DOCUMENTS

CA       2438429 A1 * 2/2005  ............... B23P 6/00
CN     101235729 A      8/2008
(Continued)

OTHER PUBLICATIONS

Machine translation of WO 2013135417 A1 (Year: 2013).*
(Continued)

*Primary Examiner* — Christopher Verdier
(74) *Attorney, Agent, or Firm* — Dority & Manning, P.A.

(57) ABSTRACT

The double-regulated turbine comprises a spherical hub, adapted to rotate around a first rotation axis, and blades, which are each able to be swivelled relative to the hub around a second rotation axis, transversal to the first rotation axis, by respective coupling flanges that are mounted fixedly on the spherical hub and that include each an attachment surface for a corresponding blade. The attachment surface of the coupling flanges includes a flat portion.

6 Claims, 2 Drawing Sheets

(51) Int. Cl.
*F03B 13/10* (2006.01)
*F03B 3/12* (2006.01)

(52) U.S. Cl.
CPC ........ *F03B 13/105* (2013.01); *F05B 2220/32* (2013.01); *F05B 2230/60* (2013.01); *F05B 2230/80* (2013.01); *Y02E 10/20* (2013.01); *Y02P 70/50* (2015.11)

(58) Field of Classification Search
CPC ........ F03B 3/145; F03B 11/04; F03B 13/105; Y02P 70/525; Y02P 70/50; F05B 2220/32; F05B 2230/60; F05B 2230/80; Y02E 10/20
See application file for complete search history.

(56) References Cited

U.S. PATENT DOCUMENTS

| | | | | |
|---|---|---|---|---|
| 2,408,677 | A * | 10/1946 | Owner | B64C 11/14 |
| | | | | 416/239 |
| 5,947,679 | A * | 9/1999 | Cybularz | F03B 3/06 |
| | | | | 415/13 |
| 5,954,474 | A * | 9/1999 | Fisher, Jr. | F03B 3/06 |
| | | | | 29/889.2 |
| 6,918,744 | B2 * | 7/2005 | Gokhman | F03B 3/02 |
| | | | | 415/161 |
| 8,602,718 | B2 * | 12/2013 | Rokeby-Thomas | F03B 3/121 |
| | | | | 415/4.2 |
| 2004/0221720 | A1 | 11/2004 | Anderson et al. | |
| 2009/0317253 | A1 | 12/2009 | Takata | |
| 2011/0067409 | A1 | 3/2011 | Beeck | |
| 2012/0013129 | A1 | 1/2012 | Cornelius | |

FOREIGN PATENT DOCUMENTS

| | | | | |
|---|---|---|---|---|
| FR | 2 839 120 A1 | 10/2003 | | |
| GB | 1 063 302 | 3/1967 | | |
| WO | WO-2013135417 A1 * | 9/2013 | ............... | B63H 1/20 |
| WO | WO-2013/167286 A2 * | 11/2013 | ............... | F03B 3/145 |

OTHER PUBLICATIONS

English machine translation of WO 2013/167286-A2, Oct. 12, 2020.*

Machine Translation and First Office Action and Search issued in connection with corresponding CN Application No. 201610965517.3 dated Dec. 4, 2017.

International Search Report and Written Opinion issued in connection with corresponding PCT application PCT/EP2015/058447 dated Jun. 22, 2015.

S M Lim et al, Development of low head Kaplan turbine for power station rehabilitation project,—2012 IOP Conference Series: Earth and Environmental Science, 15 042033, 10 pages.

* cited by examiner

DOUBLE-REGULATED TURBINE, INSTALLATION FOR CONVERTING HYDRAULIC ENERGY AND PROCESS FOR THE REHABILITATION OF A DOUBLE-REGULATED TURBINE

TECHNICAL FIELD

Embodiments of the present invention relate to a double-regulated turbine, to an installation for converting hydraulic energy into mechanical or electrical energy comprising such a turbine and to a process for the rehabilitation of a double-regulated turbine.

BACKGROUND

In the field of hydraulic energy conversion, it is known to use a turbine for converting hydraulic energy into mechanical energy or electrical energy. Double-regulated turbines are particularly suited to low water falls, with a height which does not exceed 80 m. Double-regulated turbines are also adapted to strong or variable flow rates.

A double-regulated turbine includes a spherical hub supporting several blades that involve, in operation, the rotation of the spherical hub around a rotation axis thanks to the difference of water pressure generated between the pressure-side surface and the suction-side surface of the blades.

The blades may be each swiveled relative to the hub so as to adapt the yield of the turbine. To this end, the blades are each attached to the hub by means of a coupling flange that is mounted fixedly on the spherical hub and that includes a curved attachment surface for the blade. Traditional hubs have a spherical geometry, which implies that the radius of curvature of the curved attachment surface is substantially equals to the radius of curvature of the spherical hub so as to avoid a zone of discontinuity. Consequently, the water flow circulating along the curved attachment surface of the coupling flange is accelerated. This acceleration leads to a depression, which is accentuated on the suction-side of the blade. This depression causes the formation of air bubbles within the water flow, which is a phenomenon known as cavitation.

Cavitation has a negative effect on the turbine performance and may deteriorate the blades or the hub over time.

It exists solutions to reduce this cavitation effect, such as described in FR-A-2 839 120, which teaches to equip the hub with curved facets for attaching the blades so as to reduce the space between the blades and the hub. Similarly, some turbines include an anti-cavitation lip on their blades which deviates the water flow circulating at proximity of the hub away from the latter.

Although the solutions mentioned here-above work efficiently for reducing cavitation in the gaps between the hub and the blades, they do not solve the problem of cavitation due to the spherical geometry of the hub.

Embodiments of the present invention intend to solve this drawback by proposing a double-regulated turbine wherein cavitation is reduced at proximity of the attachment surface between the blades and the hub.

To this end, embodiments of the invention concern a double-regulated turbine as defined herein.

BRIEF DESCRIPTION

According to embodiments of the invention, the flow of water circulating along the attachment surface of the hub is less accelerated since the attachment surface is flatter in comparison with traditional coupling flange, which means that water flows slowly near the coupling flange and the associated depression is lower.

An embodiment of the invention also concerns an installation for converting hydraulic energy into mechanical or electrical energy.

Finally, an embodiment of the invention concerns a process for the rehabilitation of a double-regulated turbine.

BRIEF DESCRIPTION OF THE DRAWINGS

Embodiments of the invention will now be explained in correspondence with the figures and as an illustrative example, without restricting the object of the invention. In the figures.

DETAILED DESCRIPTION

Figure 1:
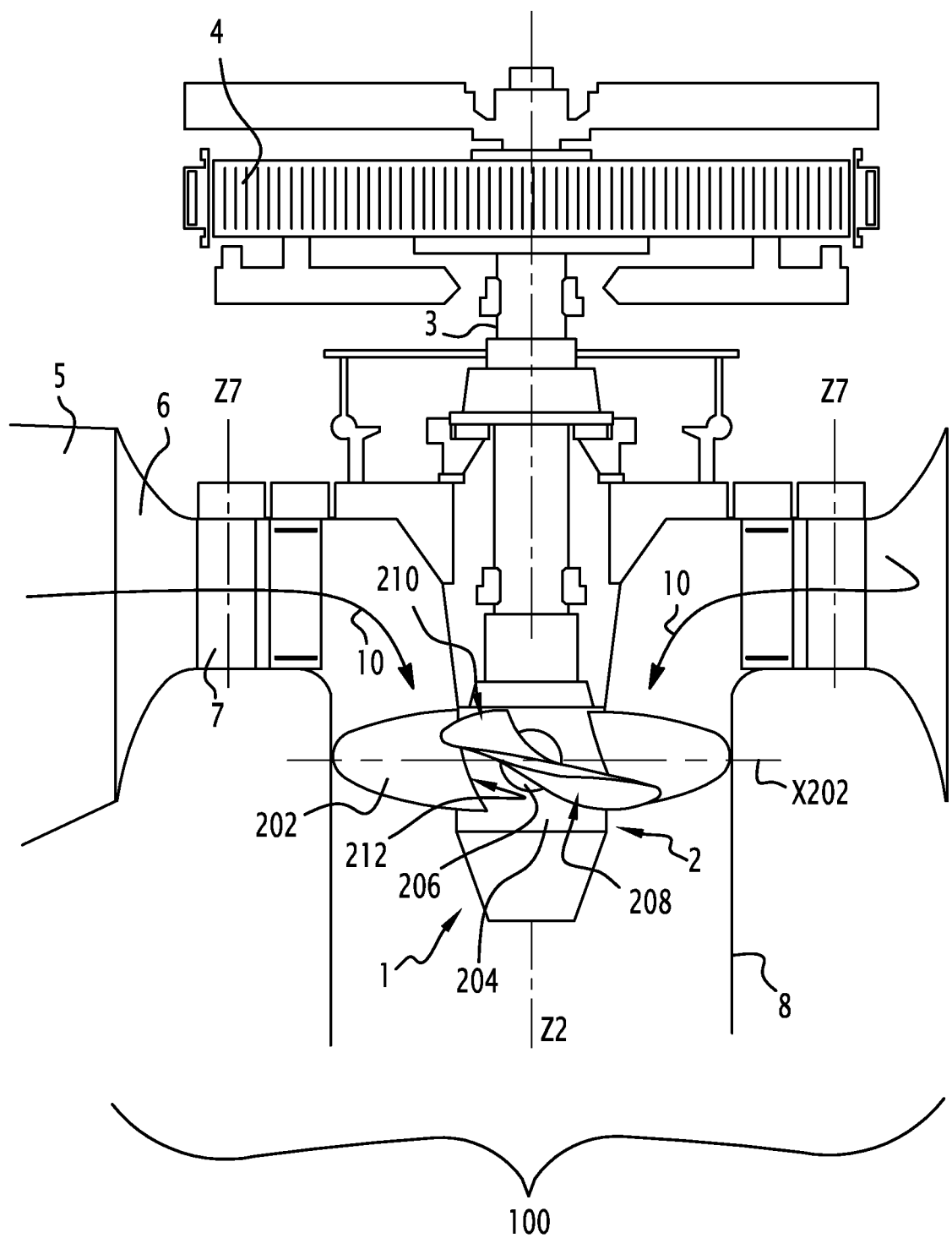
FIG. 1 is a schematical view of an installation for converting hydraulic energy into electrical energy, comprising a double-regulated turbine according to an embodiment of the invention.

On FIG. 1 is represented an installation 100 for converting hydraulic energy into electrical energy. The installation 100 includes a Kaplan turbine 1 having a wheel 2 adapted to rotate around a vertical rotation axis Z2 under the action of a forced water flow 10 coming from a non-represented reservoir. A shaft 3 supports the wheel 2 and is coupled to a generator 4 which delivers an alternative current to a non-represented electricity power grid. The installation 100 may also convert hydraulic energy into mechanical energy for operating any mechanical device.

A penstock 5 enables supplying the wheel 2 with the forced water flow 10. It extends from the reservoir to a volute 6 equipped with a distributor. The distributor includes guide blades 7 that may be pivoted around an axis Z7 parallel to Z2 so as to adjust the flow rate of the water flow 10 circulating through the turbine 1. This constitutes a first level of regulation.

A draft tube 8 is arranged downstream of the turbine 1. This draft tube 8 enables evacuating the water flow 10 downstream of the turbine 1 towards a river bed or a downstream reservoir.

The wheel 2 includes a hub 204 and blades 202 that are attached around the hub. The blades 202 have an adjustable pitch and are evenly arranged around the axis of rotation Z2.

The hub 204 includes coupling means that are secured within a non-represented cavity of the hub 204 and that are mechanically coupled to a non-represented control device. The coupling means include coupling flanges 206 that are mounted fixedly in rotation on the hub 204 and that ensure the attachment of the blades 202 on the hub 204. More precisely, the hub 204 delimits apertures O204 to receive the coupling flanges 206, one of these apertures being better visible on FIG. 2.

The coupling flanges 206 enable each to swivel a blade 202 around a rotation axis X202 that is transversal to the axis Z2. In the example, the axis X202 is radial to the axis Z2 but it may also be inclined with respect to a radial direction relative to the axis Z2. Therefore, a "transversal" direction refers to any direction that is not parallel to axis Z2. Moreover, in the example, the axis X202 intersects with axis Z2 but it may be otherwise.

The rotation of blades 202 around their respective axis X202 allows modifying the yield of the turbine 1. This constitutes a second level of regulation of the turbine 1. That is why the Kaplan turbine 1 represented on FIG. 1 is a double-regulated turbine.

The blades 202 each have a pressure-side surface 208, a suction-side surface 210 and a fixing edge 212 on a coupling flange 206.

Here-below is detailed the interaction of the water flow with only one coupling flange 206 secured to one blade 202 as it is identical for other coupling flanges 206. On FIG. 2, the hub 204 and the coupling flange 206 are not hatched for the clarity of the drawing.

Figure 2:
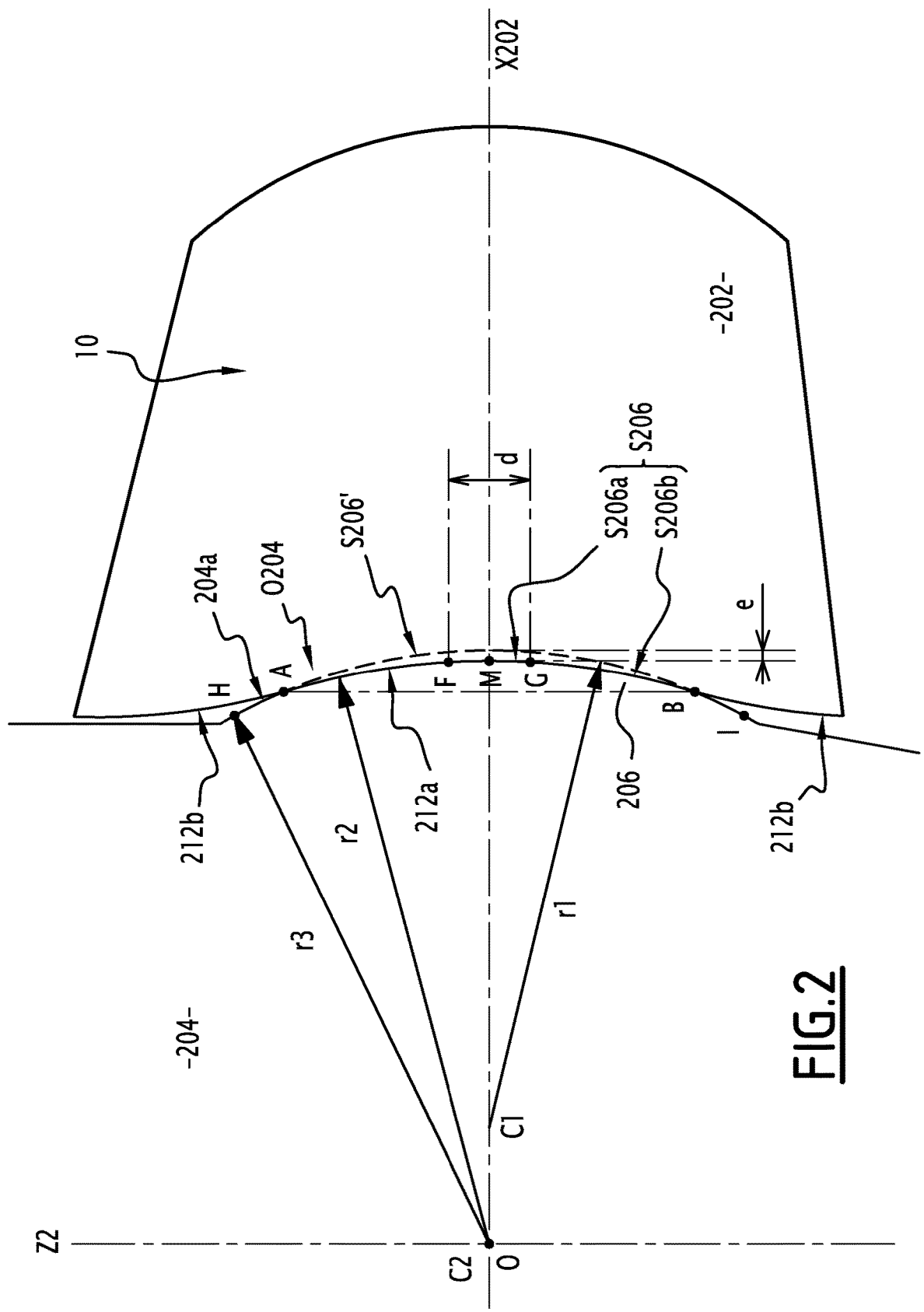
FIG. 2 is a detailed section of the double-regulated turbine of FIG. 1, illustrating the attachment between a blade and a hub by means of a coupling flange.

As shown on FIG. 2, the coupling flange 206 delimits a curved attachment surface S206 for the blade. This curved attachment surface S206 is fixed to the edge 212 of the blade 202. The fixation of the blade 202 on the coupling flange 206 may be, for instance, performed by welding the two parts together.

The edge 212 of the blade 202 includes a central area 212a that is fixedly attached to the surface S206 of the coupling flange 206 and free end portions 212b. The free end portions 212b are not in contact with the external surface S204 of the hub 204 so as to allow the rotation of the blade 202 relative to the hub 204 around the axis X202.

On FIG. 2, the attachment surface of a coupling flange supported by a traditional spherical hub is referenced as S206' and is represented with a dashed line. The surface S206' is curved and has a radius of curvature r1 that is constant over the surface S206'. C1 denotes the center of curvature of the surface S206'. C1 is located on the axis X202. For a traditional spherical hub, C1 is at the same position as the point O which is the center of the hub. The curvature of the attachment surface S206' causes acceleration of the water flow circulating along the attachment surface S206', resulting in an important depression. Moreover, this depression is accentuated on the suction-side surface 210, due to the convexity of the latter.

Depression causes the generation of air bubbles within water flow, which is known as the cavitation effect. Cavitation effect reduces the yield of the turbine and deteriorates the constitutive parts of the turbine over time.

The coupling flange 206 of the turbine 1 according to an embodiment of the invention has an attachment surface S206 having a circular outline that is centered on axis X202. So, this circular outline is especially visible when looking along axis X202 in direction of the hub 204. The diameter of the attachment surface S206 corresponds to the diameter of the receiving apertures O204 of the hub 204. The attachment surface S206 extends between points A and B on FIG. 2 and includes a flat portion S206a and a curved portion S206b surrounding the flat portion S206a. The flat portion S206a is located at the centre of the attachment surface S206 and is rotationally symmetric about the axis X202. It extends straight from a point F to a point G on the FIG. 2.

O denotes a point of intersection between axis X202 and Z2. M denotes the middle point between points F and G. The point M is the point of intersection between the surface S206a and the axis X202. The flat portion S206a is a surface perpendicular to the segment OM and to axis X202. Moreover, the flat portion S206a has a circular outline of centre M, which is centred on axis X202. The circular outline of the position S206a is especially visible when looking along axis X202 in direction of the hub 204. The ratio between the area of the flat portion S206a and the area of the attachment surface S206 is superior to 1%.

d designates the distance between points F and G, that is the diameter of the flat portion S206a. d is about 20% of the diameter of the coupling flange 206.

The curved portion S206b has a radius of curvature r2. C2 denotes the center of curvature of the upper half of the surface S206b. The center of curvature of the lower half of the surface S206b is not represented, but can be deducted by an axial symmetry about axis X202. As shown in FIG. 2, C1 and C2 are not confounded in that C1 and C2 are not identical.

The apertures O204 comprise each a rounded edge 204a that extends on the circumference of the coupling flange 206. In the cutting plane of FIG. 2, the rounded edge 204a is delimited between a point H and point A and between a point I and point B. The rounded edge 204a has a radius of curvature r3 which is equals to the radius of curvature r2 of the curved portion S206b and a centre of curvature identical to the centre C2. This ensures the continuity of the surface between the hub 204 and the coupling flange 206. In this way, there is no abrupt change of direction of the water flow circulating along the hub 204.

With the new geometry of the attachment surface, the length of the rope extending from point A to point B is inferior to the length of a rope extending along surface S206' because surface S206 includes a flat portion. Therefore, the water flow circulating along the surface S206 has a shorter path to go in comparison with an analogue water flow circulating along the curved attachment surface S206' of a coupling flange from prior art. Consequently, water flowing along the surface S206 is not as much accelerated as it would be along the surface S206' and the corresponding depression is less important. As a result, cavitation effect is less.

A process for the rehabilitation of any existing double-regulated turbine may be performed to reduce the cavitation generated in operation. Before this process is implemented, blades must be detached from the coupling flanges. The process consists to flatten the curved attachment surface S206' of the existing coupling flange so as to form a flat portion S206a at the center and to increase the radius of curvature of the curved portion surrounding the flat portion 206a in order to obtain a smooth attachment surface.

During the flattening process, the coupling flange loses thickness on its attachment surface. In practice, the coupling flange loses a maximum thickness e of about 10% of the hub diameter. This maximum thickness is measured parallel to axis X202 between the middle M of the flat portion S206a and the surface S206'. The thickness loosen by the coupling flange diminishes while approaching the outline of the coupling flange.

In a non-represented alternative embodiment, this invention may be applied to a bulb turbine having a wheel adapted to rotate around a horizontal rotation axis. Moreover, the rotation axis Z2 may be oriented in any direction, following for example the slope of a waterway.

The technical features of the different embodiments and alternative embodiments of the invention described hereabove can be combined together to generate new embodiments of the invention.

What is claimed is:

1. A double-regulated hydraulic turbine, comprising:
a spherical hub adapted to rotate around a first rotation axis;
a plurality of blades each comprising a coupling flange, each of the coupling flanges mounted on the spherical hub to allow each of the plurality of blades to swivel relative to the spherical hub around a second rotation axis that is transversal to the first rotation axis, each of the coupling flanges further comprising an attachment surface for a corresponding blade of the plurality of blades, wherein the attachment surface of each of the coupling flanges comprises a flat portion and a curved portion, the flat portion being at a center of the attachment surface and surrounded by the curved portion, the flat portion increasing a radius of curvature of the curved portion to obtain a smooth attachment surface.

2. The double-regulated hydraulic turbine of claim 1, wherein the flat portion is rotationally symmetric about the second rotation axis.

3. The double-regulated hydraulic turbine of claim 1, wherein the flat portion has a circular outline that is centered on the second rotation axis.

4. The double-regulated hydraulic turbine of claim 1, wherein a ratio of an area of the flat portion to an area of the attachment surface is greater than 1%.

5. The double-regulated hydraulic turbine of claim 1, wherein the attachment surface of each of the coupling flanges comprises a circular outline centered on the second rotation axis.

6. A method for retrofitting a double-regulated hydraulic turbine having a spherical hub and a plurality of blades, the hydraulic turbine adapted to rotate around a longitudinal axis, each of the plurality of blades being able to swivel relative to the hub around a transversal axis by respective coupling flanges, the coupling flanges being mounted on the spherical hub and each including a curved attachment surface for a corresponding blade, the method comprising:

detaching each of the plurality of blades from the respective coupling flanges; and flattening the curved attachment surfaces of the coupling flanges so as to form a flat portion at a center of each of the curved attachment surfaces, respectively, and to increase a radius of curvature of a curved portion surrounding the flat portion in order to obtain a smooth attachment surface.

* * * * *